United States Patent [19]

Eling et al.

[11] Patent Number: 4,868,043
[45] Date of Patent: Sep. 19, 1989

[54] COMPOSITE ARTICLES

[75] Inventors: Berend Eling, Berkenhof; Eric Huygens, Prosper Poulletlaan, both of Belgium

[73] Assignee: Imperial Chemical Industries PLC, London, England

[21] Appl. No.: 201,801

[22] Filed: Jun. 3, 1988

[30] Foreign Application Priority Data

Jun. 3, 1987 [GB] United Kingdom ................. 8712988

[51] Int. Cl.$^4$ ............................................... B32B 3/26
[52] U.S. Cl. ............................ 428/304.4; 428/319.3; 428/319.7; 428/424.2; 428/424.6; 521/125
[58] Field of Search ............... 428/304.4, 316.6, 318.6, 428/319.3, 319.7, 319.9, 424.6, 424.2; 521/125

[56] References Cited

U.S. PATENT DOCUMENTS

| | | | |
|---|---|---|---|
| 3,047,540 | 7/1962 | Merten | 521/126 |
| 3,817,939 | 6/1974 | Allen et al. | 528/52 |
| 4,136,240 | 1/1979 | Zimmerman et al. | 521/115 |
| 4,235,811 | 11/1980 | Schulze et al. | 260/513 N |
| 4,336,341 | 6/1982 | Fujiwara et al. | 521/109 |
| 4,588,754 | 5/1986 | Liu | 521/125 |
| 4,686,240 | 8/1987 | Bailey, Jr. et al. | 521/103 |
| 4,760,099 | 7/1988 | Canaday et al. | 521/125 |

Primary Examiner—William J. Van Balen
Attorney, Agent, or Firm—Cushman, Darby & Cushman

[57] ABSTRACT

A composite article comprising a body of semi-rigid polyurethane foam in contact with a layer of sheet of polymeric material, the foam having been prepared by reacting an organic polyisocyanate with a polymeric polyol having a hydroxyl number in the range from 20 to 80 and a crosslinking agent or chain extender having a hydroxyl number of at least 250 in the presence of water and a catalytically effective amount of an alkali metal or alkaline earth metal salt of an acid of the formula:

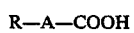

wherein R represents R'OCO—, R'COO— or R'O—, R' represents an optionally substituted hydrocarbon or heterocyclic radical and A represents an optionally substituted $C_1$-$C_3$ chain.

19 Claims, No Drawings

COMPOSITE ARTICLES

This invention relates to composite articles containing semi-rigid polyurethane foams and to methods for their production.

The manufacture of polyurethane foams has been well established for over thirty years, the general method being to react an organic polyisocyanate with an organic polyol in the presence of a foaming agent and, usually, other beneficial additives such as catalysts and surface active agents.

By suitable choice of components and conditions, foams are made which vary in properties from the soft flexible type used in upholstery applications to the hard rigid type used as structural members. Thus, flexible foams are generally made from polymeric diols or triols having hydroxyl numbers of from 20 to 80 using water as the principal foaming agent. The much higher crosslink density required in rigid foams is provided by the use of higher functionality polyols and/or polyisocyanates and here the principal foaming agent is usually a halogenated hydrocarbon such as trichlorofluoromethane.

Between the extremes of flexibility on the one hand and rigidity on the other, there exists another useful type of foam generally classified as semi-rigid. These foams, which are used as shock-absorbing materials in the passenger compartments of automobiles and elsewhere, are usually made by reacting a polyisocyanate with a mixture of a flexible foam polyol and a crosslinking agent such as trimethylolpropane.

Whilst the production of all polyurethane foams, flexible, rigid or semi-rigid, involves the same basic chemical reaction, that between isocyanate groups and hydroxyl groups, each type of foam presents different problems to the manufacturer. The differences are often associated with the balance which must always be achieved between gas generation and polymer gelation. Clearly, for example, the balance in a water-blown flexible foam system is different from that in a solvent-blown highly crosslinked rigid foam system. Many of these problems can be solved, at least partially, by appropriate choice of auxiliary agents, for example catalysts, surfactants, foam stabilisers and the like.

The catalysts conventionally used in the production of polyurethane foams are tertiary amines. From among the very large number that have been proposed there may be mentioned low molecular weight aliphatic amines such as triethylamine, long chain aliphatic amines such as N,N-dimethylcetylamine, cycloaliphatic amines such as N,N-dimethylcyclohexylamine, arylaliphatic amines such as N,N-dimethylbenzylamine, isocyanate-reactive amines such as N,N-dimethylaminoethanol, polyamines such as bis-(2-dimethylaminoethyl) ether and more complex heterocyclic compounds such as N-ethylmorpholine, N,N'-diethylpiperazine and 1,4- diazabicyclo[2.2.2]octane. Tin compounds such as stannous octoate and dibutyltin dilaurate are also widely used as catalysts, often in conjunction with tertiary amines.

In addition to tertiary amines, other basic materials are known to catalyse urethane formation and many such materials have been proposed as alternatives to the amines, which often have disagreeable odours. Examples of such materials include alkali metal salts of carboxylic acids but whilst certain salts, for example potassium acetate, have been used as trimerisation catalysts in polyisocyanurate foam formulations, they have not been used to any appreciable extent in conventional urethane systems.

Other salts have been proposed as catalysts for foam production. Thus, GB-A-2 064 567 describes a process for the production of rigid polyisocyanurate foam by reacting a polyisocyanate with a reaction product of a dibasic carboxylic acid anhydride and a polyether polyol, the latter being partially in the form of an alkali metal or alkaline earth metal alcoholate. Since the reaction product can function as polyol component and trimerisation catalyst simultaneously, it overcomes the problem of using a carboxylate having only limited solubility in the polyols normally used in polyisocyanurate formulations.

EP-A-0 220 697 is concerned with a quite different problem, namely the production of flexible polyurethane foams having improved foam stability from formulations having water contents. This publication describes formulations containing as "foam modifier" an alkali metal or alkaline earth metal salt of a Brönsted acid having a pKa greater than 1. As examples of suitable foam modifiers, there are mentioned alkali and alkaline earth metal hydroxides and alkoxides, alkali and alkaline earth metal salts of certain inorganic acids and alkali and alkaline earth metal carboxylates which may be simple acetates, for example, or the salts of more complex carboxylic acids such as may be obtained by reacting a cyclic anhydride of a dicarboxylic acid with one of the hydroxyl groups of a base polyol.

Another disadvantage which can arise with tertiary amines in addition to the odour problem is migration to adjacent materials. Thus, semi-rigid foams enclosed in a layer of a plastics material such as plasticised polyvinyl chloride are now widely used as automobile crashpads, that is the large moulded panel surrounding the instruments situated in front of the driver and front seat passenger. In these crashpads, it is often found that the PVC layer in contact with the foam becomes discoloured and it is believed that one of the causes of this discolorisation is the migration of tertiary amine from the foam into the PVC followed by reaction of the amine with the PVC and/or the plasticiser. This problem has been discussed by Wilson et al (Rubber and Plastics International, Vol. 13, No. 1, page 23, February 1988) who concluded that close co-operation between the PVC and polyurethane industries is required to solve the problem. The complexity of the problem is illustrated by Wilson et al's finding that, under certain conditions, deterioration of the PVC occurred even when the foam contained non-migratory (isocyanate-reactive) tertiary amines.

When tertiary amine catalysts in semi-rigid foam formulations are replaced by simple alkali metal carboxylates such as potassium acetate the staining of adjacent plastics materials is substantially reduced but, in general, the catalytic balance is adversely affected. In particular, when potassium acetate is used in an amount to give an acceptable cream time, the foam cures at an unacceptably slow rate resulting in long demould or jig dwell times.

It has now been found that satisfactory catalysis in the production of these composite articles can be achieved by the use of the salts hereinafter defined.

Accordingly, the invention provides a composite article comprising a body of semi-rigid polyurethane foam in contact with a layer or sheet of polymeric material, the foam having been prepared by reacting an organic polyisocyanate with a polymeric polyol having a hydroxyl number in the range from 20 to 80 and a crosslinking agent or chain extender having a hydroxyl number of at least 250 in the presence of water and a catalytically effective amount of an alkali metal or alkaline earth metal salt of an acid of the formula:

$$R-A-COOH \qquad (1)$$

wherein R represents R'OCO—, R'COO— or R'O—, R' represents an optionally substituted hydrocarbon or heterocyclic radical and A represents an optionally substituted $C_1-C_3$ chain.

The salt of the acid of formula 1 may be a salt of any metal of Groups IA and IIA of the Periodic Table but, in general, the alkali metal salts, that is to say the Groups IA metal salts, are preferred, especially the potassium salts. If desired, mixtures of such salts may be used, for example a mixture of potassium and sodium salts, or mixtures of one or more of the salts with a free acid of formula 1.

Optionally substituted hydrocarbon radicals which may be represented by R' include optionally substituted alkyl, cycloalkyl, aralkyl and aryl radicals. Examples of suitable substituents include hydroxy groups. Particularly suitable radicals include hydroxy terminated polyoxyalkylene radicals, for example hydroxy terminated polyoxyethylene radicals.

Divalent radicals which may be represented by A include $$-CR_2{}^2-, \; -CR_2{}^2CR_2{}^2-, \; -CR_2{}^2CR_2{}^2CR_2{}^2-,$$

$$-CR^2=CR^2- \text{ and } -CR_2{}^2C-\underset{CR_2{}^2}{\overset{\parallel}{}}$$

radicals, wherein $R^2$ is hydrogen or lower alkyl as well as radicals of the formula:

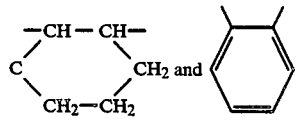

In general, salts of acids of formula 1 wherein A is an optionally substituted $C_1-C_2$ radical are preferred on account of their superior catalytic activity, especially salts of maleic acid, A then being a radical of the formula —CH=CH—. Also on the ground of superior activity, it is preferred that R is a radical of the formula R'OCO—. The acids of formula 1 wherein R is R'O-CO— may be prepared by reacting an alcohol of the formula:

$$R'-OH \qquad (2)$$

with an acid anhydride of the formula:

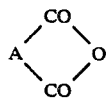

wherein R' and A have the meanings given above.

Examples of compounds of formula 2 which may be used include alcohols, for example 2-octanol, cyclohexanol or benzyl alcohol, phenols, polylactic acid and polyoxyalkylene polyols such as polyethylene glycols, especially polyethylene glycols having molecular weights below 500, for example 200.

Examples of suitable acid anhydrides include succinic, glutaric, maleic, phthalic and itaconic anhydrides and the anhydrides of 1,2-cyclohexane and 1,2-cyclohexene dicarboxylic acids.

Acids of formula 1 wherein R is R'COO— may be prepared by reacting an acid of the formula R'COOH with a hydroxy acid of the formula HOACOOH. Acids of formula 1 wherein R is R'O— may be prepared as for instance described in Beilstein Handbuch der Organischen Chemie, 3, 232 and 3, 233. The salts may be formed from the free acids in conventional manner, for example by reacting an acid of formula 1 with the appropriate metal carbonate. If desired, a deficiency of metal carbonate may be used so that the product is a mixture of salt and free acid.

A catalytically effective amount of the salt will usually be in the range from 2 to 30 milliequivalents, preferably from 5 to 12 milliequivalents based on 100 grams of polymeric polyol.

Organic polyisocyanates which may be employed in preparing the semi-rigid polyurethane foam include aromatic diisocyanates, especially those which are commercially available such as tolylene and diphenylmethane diisocyanates. Since liquid polyisocyanates are preferred, it is convenient to use MDI isomer mixtures or MDI variants containing urethane, allophanate, urea, biuret, carbodiimide or uretonimine residues. Also useful are polymethylene polyphenylene polyisocyanates commonly known as "crude" or "polymeric" MDI. Suitable forms of urethane modified MDI include polyester or polyether based prepolymers.

Polymeric polyols which may be used in preparing the foam include the polyether and polyester polyols conventionally employed in the manufacture of flexible foams. Particular mention may be made of polyoxypropylene and poly(oxypropylene-oxyethylene) diols and triols having molecular weight of from 1500 to 8000, especially ethylene oxide capped polyoxypropylene diols and triols. If desired, polymer polyols formed by the polymerisation of one or more olefinic monomers in a polyether or polyester polyol may be used.

Crosslinking agents which may be used include non-polymeric polyols having three or more hydroxyl groups and their lower molecular weight oxyalkylation products. A preferred crosslinking agent is trimethylolpropane. Chain extenders include diols such as ethylene glycol in 1,4-butanediol. The degree of flexibility/rigidity in the foamed product can be varied on known manner by varying the proportion of crosslinking agent or chain extender to polymeric polyol. In general, the crosslinking agent or chain extender should provide from about 10 to 75%, especially from about 25 to 75% of the hydroxyl groups in the foam forming reaction mixtures. Preferred crosslinking agents and chain extenders have hydroxyl numbers of at least 300.

The water used as blowing agent is suitably present in the foam forming reaction mixture in amounts of from 0.1 to 4.5% by weight, especially from 1.5 to 3.5% by weight, based on the weight of polymeric polyol. Other blowing agents such as trichlorofluoromethane may be included, if desired, to provide additional foaming.

The amount of polyisocyanate used relative to the polyols and water is usually such as to provide an isocyanate index in the range 80 to 130, especially 90 to 130, an index of about 100 being preferred.

The foam-forming reaction mixture may also contain other conventional ingredients of polyurethane foam formulations, for example surface active agents which may be of either the silicone or the non-silicone type. Tertiary amine catalysts may also be included but are preferably excluded if staining of adjacent polymeric materials is to be avoided. Other useful additives cell openers.

In practising the invention, it is usually convenient to incorporate the catalytic salt in the polyol component prior to reaction with the polyisocyanate.

Accordingly, the invention also provides a reaction system for use in the preparation of the polyurethane semi-rigid foam component of the composite articles comprising:
(A) an organic polyisocyanate, and
(B) a polyol component comprising:
  (i) a polymeric polyol having a hydroxyl number in the range from 20 to 80;
  (ii) a crosslinking agent or chain extender having a hydroxyl number of at least 250;
  (iii) water, and
  (iv) a catalytically effective amount of an alkali metal or alkaline earth metal salt of an acid of formula 1.

The polymeric material which is in contact with the foam in the composite articles of the invention may be, for example, a decorative and/or protective facing material. As examples of such materials, there may be mentioned textile materials, paper and plastics materials, for example polyvinyl chloride which may contain plasticisers.

The composite articles of the invention may be prepared by bonding a pre-formed semi-rigid polurethane foam to the polymeric material but, in general, it is preferred to form the foam in contact with the polymeric material.

Thus, in a further aspect of the invention, there is provided a method for the preparation of a composite article which comprises contacting a layer or sheet of polymeric material with a reaction system as hereinbefore described whereby to form a body of semi-rigid polyurethane foam in contact with the polymeric material.

The invention is illustrated but not limited by the following Examples:

EXAMPLE 1

A 3-neck round-bottomed flask fitted with stirrer, thermometer and condenser was charged with two moles of polyethylene glycol (mol. weight 200) and the temperature was raised to 50 Deg. C. One mole of acid anhydride was added portionwise at such rate that each portion had reacted before the addition of a further amount. When the reaction was completed, as indicated by acid titration, half a mole of potassium carbonate was added as a 50% aqueous solution. After completion of this reaction, water was removed at 100 Deg. C under vacuum. A typical analysis of the product is a water content of approximately 1-2% and an acid value of 4-10 mg KOH/g. In this way, catalysts A and B were prepared using maleic anhydride and itaconic anhydride respectively.

Free acid B was then prepared by reacting one mole of the polyethylene glycol with one mole of itaconic anhydride at 50 Deg. C.

EXAMPLE 2

A 3-neck round-bottomed flask fitted with stirrer, thermometer and condenser was charged with one mole of ethoxyethoxyethane and the temperature was raised to 50 Deg. C. One mole of maleic anhydride was added portionwise at such a rate that each portion had reacted before the addition of a further amount. When the reaction was completed, as indicated by acid titration, the reaction temperature was decreased to 30° C. Subsequently 50% by weight of the content of the flask of methanol was added. Then, half a mole of an alkali metal carbonate was added portionwise at such a rate that the frothing due to carbondioxide liberation was controllable. After the completion of this saponification reaction, a 50/50 by weight mixture of dipropylene glycol and ethylene glycol was added. The amount of glycol mixture added was equal to the weight of the synthesized salt, i.e. the weight of the diol mixture was equal to the (total) weight of one mole of ethoxyethoxyethanol, maleic anhydride and one mole of alkali metal. The methanol and water were removed under vacuum in a rotary evaporator at a water bath temperature of approximately 80° C. A typical analysis of the alkali carboxylates produced by this method is a water content of approximately 0.2-0.4% and an acid value of 1-3 mg KOH/g. In this way, catalysts C, D and E were prepared using sodium carbonate, potassium carbonate and rubidium carbonate, respectively.

EXAMPLE 3

700 gram of 2-lactic acid (lactic acid containing approximately 10% of water, obtained from CCA biochem bv, Gorinchem. Holland) was charged to a three neck-flask equipped with a stirrer, a $N_2$ purge and a take-off condenser and heated up to 140°-150°. After six hours of polymerization, the thus formed poly(lactic acid) had an acid value of 150 mg KOH/g. 420 1 gram of the viscous poly(lactic acid) was charged into a 3-necked flask, equipped with a stirrer and a condenser and the temperature was raised to 60° C. Subsequently, 83 gram of maleic anhydride was added portionwise and reacted for 3 hours. Then 300 ml of methanol was added and the mixture was cooled to 30° C. To this mixture 183 gram of potassium carbonate had to be added in order to obtain an acid value of 1 mg KOH/g. Prior to evaporation (rotary evaporator, water bath temperature 80° C.) of the methanol and water, 450 gram of a mixture of dipropylene glycol and Renex 688 (ethoxylated nonylphenol, Atlas) in a ratio of 65/35 by weight was added in order to obtain a free flowing catalyst. This catalyst is referred to in the following Tables as catalyst F.

EXAMPLE 4

The potassium salt of ethoxyacetic acid (Aldrich) was obtained from straightforward neutralization of ethoxyacetic acid with aqueous potassium hydroxide. The catalyst was used as a 60% solution in water and called catalyst G in the following.

EXAMPLE 5

A non-pigmented lead-stabilised PVC foil (1 mm thickness) was placed in an aluminum mould (15×30×1 cm) at 40 Deg. C and a 70 g reaction mixture was foamed thereon. Twelve foam/PVC composites were made in this way, the formulations and foaming characteristics being given in Table 1.

Formulations 9 and 10 using conventional tertiary amine catalysts (Dabco 33LV and Niax A-1) and Formulations 11 and 12 using potassium acetate and potassium formate have been included for comparative purposes. The potassium acetate was used as a 50% solution in ethylene glycol and the potassium formated as a 44% solution in a 13:1 mixture of ethylene glycol and water.

Of each of the foam/PVC composites so made, three dogbone shaped specimen with dimensions according to DIN 530504 S2 were cut. The three specimen thus prepared were put into a Petri dish with a diameter of approximately 10 cm and held at 120° C. in an air circulation oven. After 100, 250 and 500 hours of ageing each time one of the samples was taken of the Petri dish. The staining results given in Table 2 show that the tertiary amine catalysts caused much more discoloration than the salts. Potassium acetate exhibits good staining characteristics but the cure is unacceptably slow whilst potassium formate is a good cure catalyst but provides unacceptable staining.

TABLE 1

| | Formulation | | | | | |
|---|---|---|---|---|---|---|
| | 1 | 2 | 3 | 4 | 5 | 6 |
| Polyol | 100.00 | 100.0 | 100.00 | 100.0 | 100.00 | 100.0 |
| Trimethylolpropane | 2.8 | 2.8 | 2.8 | 2.8 | 2.8 | 2.8 |
| Water | 2.5 | 2.5 | 2.5 | 2.5 | 2.5 | 2.5 |
| Surfactant | 1.0 | 1.0 | 1.0 | 1.0 | 1.0 | 1.0 |
| Catalyst A | 5.0 | — | — | — | — | — |
| Catalyst B | — | 2.0 | 5.3 | — | — | — |
| Acid B | — | — | 1.9 | — | — | — |
| Catalyst C | — | — | — | 4.0 | — | — |
| Catalyst D | — | — | — | — | 2.5 | — |
| Catalyst E | — | — | — | — | — | 2.9 |
| Polyisocyanate | 58.0 | 55.3 | 58.9 | 59.5 | 57.6 | 58.2 |
| Cream time (s) | 19 | 17 | 17 | 30 | 18 | 18 |
| Gel time (s) | 44 | 72 | 57 | 65 | 57 | 53 |
| Rise time (s) | 62 | 150 | 95 | 115 | 120 | 120 |
| Demold time (min) | 4 | 8 | 5 | 5 | 6 | 5 |

| | Formulation | | | | | |
|---|---|---|---|---|---|---|
| | 7 | 8 | 9 | 10 | 11 | 12 |
| Polyol | 100.00 | 100.0 | 100.00 | 100.0 | 100.00 | 100.0 |
| Trimethylolpropane | 2.8 | 2.8 | 2.8 | 2.8 | 2.8 | 2.8 |
| Water | 2.5 | 2.1 | 2.5 | 2.5 | 2.5 | 2.5 |
| Surfactant | 1.0 | 1.0 | 1.0 | 1.0 | 1.0 | 1.0 |
| Catalyst F | 1.8 | — | — | — | — | — |
| Catalyst G | — | 0.9 | — | — | — | — |
| Dabco 33LV | — | — | 0.45 | — | — | — |
| Niax A-1 | — | — | — | 0.15 | — | — |
| Potassium acetate | — | — | — | — | 0.45 | — |
| Potassium formate | — | — | — | — | — | 0.80 |
| Polyisocyanate | 54.5 | 53.5 | 54.1 | 54.0 | 53.6 | 55.5 |
| Cream time (s) | 18 | 18 | 17 | 19 | 17 | 17 |
| Gel time (s) | 62 | 90 | 86 | 95 | 80 | 65 |
| Rise time (s) | 140 | 200 | 175 | 200 | 195 | 140 |
| Demold time (min) | 7 | 9 | 10 | 9 | 13 | 7 |

The polyol used in these formulations was an ethylene oxide tipped oxypropylated glycerol having a hydroxyl number of 28. The surfactant was Silicone B 4113 (Goldschmidt). The polyisocyanate was a liquid MDI.

TABLE 2

Discoloration of PVC skin as a function of time at 120° C.

| Time | 100 h. | 250 h. | 500 h |
|---|---|---|---|
| Composite 1 | slight | slight/moderate | moderate |
| Composite 2 | very slight | slight | slight/moderate |
| Composite 3 | very slight | slight | slight/moderate |
| Composite 4 | slight | slight/moderate | moderate/strong |
| Composite 5 | slight | slight/moderate | moderate |
| Composite 6 | slight | slight/moderate | moderate |
| Composite 7 | slight | slight/moderate | moderate/strong |
| Composite 8 | slight | slight/moderate | moderate/strong |
| Composite 9 | strong | very strong | total discoloration |
| Composite 10 | moderate | strong | very strong |
| Composite 11 | slight | slight/moderate | moderate |
| Composite 12 | slight/moderate | moderate | strong |

What is claimed is:

1. A composite article comprising a body of semi-rigid polyurethane foam in contact with a layer of sheet of polymeric material, the foam having been prepared by reacting an organic polyisocyanate with a polymeric polyol having a hydroxyl number in the range from 20 to 80 and a crosslinking agent or chain extender having a hydroxyl number of at least 250 in the presence of water and a catalytically effective amount of an alkali metal or alkaline earth metal salt of an acid of the formula:

R—A—COOH 

wherein R represents R'OCO—, R'COO— or R'O—, R' represents an optionally substituted hydrocarbon or heterocyclic radical and A represents an optionally substituted $C_1$-$C_3$ chain.

2. A composite article according to claim 1 wherein the foam has been prepared by reacting an organic polyisocyanate with a polymeric polyol having a hydroxyl number in the range from 20 to 80 and a crosslinking agent having a hydroxyl number of at least 300 in the presence of water and a catalytically effective amount of an alkali metal or alkaline earth metal salt of an acid of the formula:

R'OCO—A—COOH 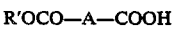

wherein R' and A have the meanings given in claim 1.

3. A composite article according to claim 1 wherein the salt is a potassium salt.

4. A composite article according to claim 1 wherein R' is a hydroxy terminated polyoxyethylene radical.

5. A composite article according to claim 1 wherein A is a $C_1$-$C_2$ radical.

6. A composite article according to claim 1 wherein A is —CH=CH—.

7. A composite article according to claim 1 wherein the salt is present in an amount of from 2 to 30 milliequivalents per 100 grams of polymeric polyol.

8. A composite article according to claim 1 wherein the organic polyisocyanate comprises a diphenylmethane diisocyanate.

9. A composite article according to claim 1 wherein the crosslinking agent is trimethylolpropane.

10. A composite article according to claim 1 wherein the crosslinking agent or chain extender provides from about 10 to 75% of the hydroxyl groups in the foam forming reaction mixture.

11. A composite article according to claim 10 wherein the crosslinking agent provides from 25 to 75% of the hydroxyl groups in the foam forming reaction mixture.

12. A composite article according to claim 1 wherein the foam forming reaction mixture contains from 0.1 to 4.5% by weight of water based on the weight of polymeric polyol.

13. A composite article according to claim 12 wherein the reaction mixture contains from 1.5 to 3.5% by weight of water based on the weight of polymeric polyol.

14. A composite article according to claim 1 wherein the foam forming reaction is performed in the absence of a tertiary amine.

15. A composite article according to claim 1 wherein the polymeric material in contact with the foam comprises polyvinyl chloride.

16. A reaction system for use in preparing the semi-rigid polyurethane foam component of the composite article of claim 1 comprising:
   (A) an organic polyisocyanate, and
   (B) a polyol component comprising:
      (i) a polymeric polyol having a hydroxyl number in the range from 20 to 80;
      (ii) a crosslinking agent or chain extender having a hydroxyl number of at least 250;
      (iii) water, and
      (iv) a catalytically effective amount of a salt as defined in claim 1.

17. A polyol component of the reaction system of claim 16 comprising:
   (i) a polymeric polyol having a hydroxyl number in the range from 20 to 80;
   (ii) a crosslinking agent or chain extender having a hydroxyl number of at least 250;
   (iii) water, and
   (iv) a catalytically effective amount of a salt as defined in claim 1.

18. A polyol component according to claim 17 comprising:
   (i) a polymeric polyol having a hydroxyl number in the range from 20 to 80;
   (ii) a crosslinking agent having a hydroxyl number of at least 300;
   (iii) water, and
   (iv) a catalytically effective amount of a salt as defined in claim 2.

19. A method for the preparation of a composite article according to claim 1 which comprises contacting a layer or sheet of polymeric material with a reaction system as defined in claim 16 whereby to form a body of semi-rigid polyurethane foam in contact with the polymeric material.

* * * * *